United States Patent Office 3,308,170
Patented Mar. 7, 1967

3,308,170
SUBSTANTIALLY LINEAR POLYDIENE ALCOHOLS HAVING MAJORITY OF HYDROXY GROUPS TERMINAL BY PREPARING POLYDIENE IN HYDROCARBON AND THEN USING ETHER MEDIUM DURING EPOXIDE ADDITION
Ervin G. Pritchett, Cincinnati, Ohio, and Noel L. Hofmann, University Park, Pa., assignors to National Distillers and Chemical Corporation, New York, N.Y., a corporation of Virginia
No Drawing. Filed Aug. 28, 1963, Ser. No. 305,227
13 Claims. (Cl. 260—632)

This invention relates to hydroxyl-terminated linear polydienes and to a process for preparing such terminated dienes.

Non-linear polydienes, that is, those in which the the polymerization of a 1,3-diene has proceeded largely via 1,2 addition to chains having more than about 60 percent pendant alkenyl groups, terminated with primary hydroxyl groups are known. It is also known that linear diene rubbers in which about 80 to about 90 percent of the 1,3-diene units have polymerized in 1,4 fashion can be prepared by polymerization of the diene with an organolithium compound in a hydrocarbon solvent, the polymer chain being characterized by an alkenyl-to-internal unsaturation ratio of only about 0.25 to about 0.1.

Further, it is known how to prepare a linear lithium-terminated polydiene in a hydrocarbon solvent and react it with ethylene oxide; however, it has now been found that in hydrocarbon solvents group transfer reactions other than simple termination with ethylene oxide occur to yield undesired mixtures. For example, it has been found that, when a monolithiopolybutadiene in a hydrocarbon solvent is reacted with ethylene oxide and then acidified, the product is a mixture containing, in addition to the expected polybutadienemonool, up to 35 percent of non-hydroxylated polybutadiene plus polybutadiene chains having attached thereto more than one hydroxyl group per molecule. It is possible to obtain products of improved purity by carrying out the reaction at impractically low temperatures, i.e., about −60° to −85° C.

The processes of the prior art, therefore, yield products that either are non-linear or are heterogeneous mixtures of linear molecules having different numbers of hydroxyl groups. The non-linear products possess an undesirably high viscosity in the molecular weight ranges desired particularly for reaction of the products with diisocyanates to produce urethane derivatives or polyurethanes. The heterogeneous linear products are unsuitable for making polyurethanes and for other reactions that depend upon a relatively pure alcohol reactant.

It is an object of this invention to provide novel and useful polydiene monools and diols characterized by a linear polydiene chain having less than 50 percent pendant alkenyl groups, i.e., an alkenyl-to-internal unsaturation ratio of less than 1.

It is a further object of this invention to provide a process for the preparation of linear polydiene monools and diols composed nearly entirely either of molecules having one hydroxyl group or of molecules having two hydroxyl groups, respectively.

It is a still further object of the invention to provide a process for the preparation of linear polydienes of high purity in which more than 92 percent of the polydiene chains are terminated with primary hydroxyl groups.

Another object of this invention is to provide a process for preparing linear polydiene monools and diols in which more than 92 percent of the linear polydiene molecular chains are terminated with one or two primary hydroxyl groups, respectively, said products being capable of being converted to improved surfactants, plasticizers, or condensation polymers by reaction of the primary hydroxyl groups with suitable reagents.

Additional objects will become apparent from the following detailed description.

It has now been found that linear dienes comprising almost entirely molecules with either one or two hydroxyl groups each, depending upon whether the starting material is a mono- or a dilithium-terminated compound, can be obtained by reacting linear lithium-terminated polydienes with an olefin oxide in an ether or in a hydrocarbon medium containing an ether. The addition of an ether to a hydrocarbon solution of a linear lithium-terminated diene results unexpectedly in the repression of undesired transfer reactions during the reaction with the olefin oxide, yielding products that can be converted by acidification to high purity, primary hydroxyl-terminated linear polydienes.

Although the practice of the process is not intended to be limited thereto, in the following description ethylene oxide will be used as the olefin oxide; other olefin oxides such as propylene oxide, butylene oxide, styrene oxide, etc., however, are equally useful.

In one embodiment the process is carried out by first preparing a lithium-terminated linear polydiene in a hydrocarbon solvent by any convenient means. The hydrocarbon solution of the lithium-terminated polymer is then chilled sufficiently, e.g., to about −60° to +10° C., depending upon the ether to be used, to prevent destructive reaction of the organolithium with an ether diluent; the chilled solution is diluted with an ether; and ethylene oxide is added to the chilled mixture rapidly with agitation. After a short reaction time of about 10 to 30 minutes, the total mixture is warmed to about 0° to 60° C. and acidified, e.g., with aqueous oxalic acid, hydrochloric acid, sulfuric acid, or acetic acid; the primary hydroxyl linear polydiene product is then isolated in high purity, for example by evaporating the solvents.

In another embodiment the lithiopolydiene solution can be added to a solution of ethylene oxide in ether or in an ether-hydrocarbon mixture.

All of the solvents, diluents, and reagents must be free of oxygen, water, carbon dioxide, and any other impurity that can destroy organolithium reagents. The reactions, therefore, must take place in an inert atmosphere, for example, under a blanket of nitrogen, helium, argon, or the like.

The lithium-terminated linear polydiene may be a mono- or a dilithium-terminated linear poly-1,3-butadiene, polyisoprene, poly-1,3-pentadiene, polychloroprene, poly-2,3-dimethyl-1,3-butadiene, and the like; or mono- or dilithium-terminated copolymers of styrene and the above-mentioned 1,3-dienes; however, a mono- or dilithium-terminated linear polybutadiene is preferred.

The primary hydrocarbon solvent may be any suitable aliphatic or aromatic hydrocarbon, examples of which include pentane, hexane, heptane, heptene-1, isooctane, purified kerosene, cyclohexane, cylcohexene, benzene, toluene, xylene, alkylate and the like, or mixtures thereof.

The ether required for the instant process is suitably a saturated hydrocarbyl aliphatic or hydrocarbyl aromatic ether, for example dimethyl ether, diethyl ether, methyl ethyl ether, glycol diethyl ether, glycol dibutyl ether, tetrahydrofuran, dimethoxyethane, dioxane, methyl butyl ether, ethyl butyl ether, dibutyl ether, methyl phenyl ether, diphenyl ether, butyl laurel ethylene glycol ethers, trimethylene glycol dimethyl ether, glycerol trimethyl ether, glycerol dimethyl ethyl ether, and the like, or mixtures thereof.

As stated above, the manner in which the lithium-terminated polydiene is prepared is not critical. One convenient means of preparing it is by the polyaddition of a diene monomer to a suitable mono- or dilithioorgano compound in a wholly hydrocarbon solvent using an initiator such as butyl lithium or pentamethylene dilithium to yield the mono- or dilithio-terminated polymer.

These products are characterized by a molecular weight in the range of about 500 to 10,000, and more particularly in the range of about 1500 to 6,000; by a ratio of alkenyl-to-internal unsaturation within the range of about 0.1 up to 1; and by polymer chains substantially all of which are terminated with the same number of hydroxyl groups. Accordingly, these products are substantially pure monools where a monolthio-terminated polymer is used and substantially pure diols where a dilithio-terminated polymer is employed.

Although the concentration of the lithium-terminated linear polydiene in the hydrocarbon solvent is not unduly critical, the preferred range is about 5 to about 50 percent of lithium-terminated polydiene. Lower concentrations are not economical and higher concentrations require excessive control measures in the initial polymerization step.

In the termination step, all of the hydrocarbon solvent may be replaced by an ether, but simple dilution with the ether is preferred. Preferably, the amount of ether employed can vary from about 1 up to about 50 percent of the hydrocarbon solvent, and more preferably about 10 to about 30 percent of ether is used. Higher concentrations are not economical and lower concentrations result in reduced effectiveness of the treatment.

The amount of the ethylene oxide can range from about 1 to about 10 moles per atom of terminal lithium; preferred ratios are about 1.5 to 2.5 moles per atom.

Both the ether and the ethylene oxide must be added at temperatures that eliminate excessive reaction of the ether with the lithium-terminated polydiene, that is, between about 10° C. and −60° C. The preferred temperature range is about −10° to −30° C.

When the reaction is complete, the purified primary hydroxyl-terminated linear polydienes are recovered by acidification, evaporation, and filtration, or other suitable means.

The following examples illustrate methods of carrying out the present invention; it is to be understood, however, that these examples are given for purposes of illustration and not of limitation. Unless otherwise specified, all parts are given by weight.

(A) In the examples polybutadieneol is analyzed for polybutadiene content by the following method: A mixture of 0.75 mmole of the hydroxy-terminated polymer, 3.0 mmole of powdered phthalic anhydride, 3 ml. of pyridine, and 10 ml. of toluene was refluxed for one hour. Water (0.25 ml.) was added, and reflux was continued for 15 minutes to destroy excess anhydride. The water was azeotroped off into a Dean-Starke trap, the remaining solution was filtered from boiling chips with toluene rinses and concentrated if necessary, and the solution was then diluted to exactly 25 ml. with toluene after the addition of 2 ml. of pyridine to maintain solubility.

Evaporation of a measured sample gave the concentration of non-voltailes, the phthalate half-ester, and the polybutadiene.

Five ml. of the solution was passed through a column of Fisher chromatographic grade alumina in a 50-ml. burette, elution being made with 100 ml. of toluene. Evaporation of the eluate in 10-ml. portions as recovered gave an oil, normally all from the first 30 ml. of eluate. Identification of the oil as polybutadiene unmodified by functional groups was readily made via infrared spectroscopy. The percent of polybutadiene hydrocarbon was calculated as weight percent of oil on the original hydroxy-terminated polymer charged.

(B) The polyol products in the polybutadieneol were detected by the following procedure: The polymer, as a solution in hexane, was adsorbed on a column of Fisher chromatographic grade alumina and carefully eluted with 50 percent hexane-benzene (fraction H), benzene (fraction M), diethyl ether (fraction D), and methanol (fraction P) in that order. Adsorption was not strong and the fractions tended to overlap.

Infrared analysis of the fractions compared to the bulk sample revealed differences in the hydroxyl contents of the various fractions, indicating a fundamental difference in their natures. Hydroxyl contents were calculated from the ratio of absorbencies at 3 and at 5.5 microns.

Data obtained for a sample of polybutadieneol produced by etheylene oxide-termination of lithiopolybutadieneol in n-heptane are tabulated below:

TABLE I

| Fraction | Uncorrected | | Corrected | |
|---|---|---|---|---|
| | Percent of Sample | Percent of OH | Percent of Sample, recovery | Functionality* |
| Bulk | 100 | 0.78 | 99.8 | 1.0 |
| H | 60.3 | 0.425 | 32.3 | 0 |
| M | 23.5 | 0.616 | 51.8 | 1 |
| D | 11.8 | 1.95 | 9.4 | 2 |
| P | 4.2 | 3.55 | 6.6 | 4.4 |

*Functionality is the number of functional groups (hydroxyl) per molecule. All fractions had essentially the same bulk viscosity and vinyl/internal unsaturation ratio as the bulk sample.

*Example I*

The reactor was a 500-ml. glass flask equipped with heater; external cooling bath; thermometer; Dry Ice-cooled condenser; high speed stirrer; and inlets for solvent, catalyst, monomer, additives, and argon gas. The reactor was thoroughly dried, evacuated, and filled with argon; a slight pressure of argon was maintained throughout operation.

140 parts of sodium-dried n-heptane was put into the reactor, and the temperature of the system was adjusted at 50° C. 1.97 parts of n-butyl lithium in heptane was added, and then 29.1 parts of purified butadiene-1,3 was added over a period of one hour at 50° C. with agitation. An additional period of one hour was allowed for complete reaction of the butadiene.

The resulting lithiopolybutadiene solution was cooled to 5° C., and about 3 parts of ethylene oxide was added rapidly. Stirring was continued for 30 minutes to assure complete reaction, the solution was poured out over powdered Dry Ice, and the mixture was allowed to warm to ambient temperature.

The clear heptane solution was acidified with aqueous oxalic acid, water-washed, and dried. Removal of the solvent by distillation at 100° C./0.5 mm. left 30.5 parts (94.7 percent) of a liquid having a viscosity of 4.2 poise/ 25° C., an acid number of 0.65, a hydroxyl number of 44.17, and a ratio of alkenyl to internal unsaturation of 0.425 as determined by infrared analysis. The molecular weight by end group analysis was 1240.

The impurity of the product was shown by fractionation of its phthalic half-ester by the process described, 17.6 percent by weight being isolated as non-hydroxyl-containing polybutadiene.

*Example II*

Lithiopolybutadiene in n-heptane was prepared by the procedure of Example I using 0.885 part of butyl lithium and 30.1 parts of butadiene-1,3. The resulting solution was slowly added at −30° C. to a well-stirred solution of about 6 parts of ethylene oxide in 35 parts of heptane, the heptane having been treated previously with 0.177 part of 2.79 M butyl lithium as purifier. Air and moisture were excluded from the system.

The product, 31.0 parts (98 percent), was acidified and isolated by the procedure of Example I. It has a viscosity of 9.8 poise/25° C., an acid number of 0.14, a hydroxyl number of 21.5, and an alkenyl to internal unsaturation ratio of 0.24. The molecular weight by end group analysis was 2580. It analyzed for 12.3 percent of non-hydroxyl-containing polybutadiene.

Example III

Lithiopolybutadiene in n-heptane was prepared by the procedure of Example I using 0.885 part of butyl lithium and 30.0 parts of butadiene-1,3. The solution was cooled to −60° C., and 4 parts of ethylene oxide was added.

The product, 29.6 parts (94.0 percent), was acidified and isolated by the procedure of Example I. It had a viscosity of 9.5 poise/25° C., an acid number of 0.67, a hydroxyl number of 22.7, and a vinyl to internal unsaturation ratio of 0.233. The molecular weight by end group analysis was 2340. The product analyzed for 9.7 percent of non-hydroxyl-containing polybutadiene.

Example IV

This example illustrates that the critical step in the synthesis of linear, functionalized polydienes is the termination reaction with an olefin oxide, since termination with carbon dioxide and subsequent acidification yield a product containing only a very minor amount of unfunctionalized hydrocarbon.

Lithiopolybutadiene in n-heptane was prepared by the procedure of Example I using 0.885 part of butyl lithium and 30.1 parts of butadiene-1,3. The solution was cooled to −60° C. and poured directly over Dry Ice powder.

The product, 29.0 parts (91.5 percent), was acidified and isolated by the procedure of Example I. It had a viscosity of 15.6 poise/25° C., an acid number of 22.4, and a ratio of alkenyl to internal unsaturation of 0.215. The molecular weight by end group analysis was 2510. A sample of the acid, analyzed as in the preceding examples but without pre-reaction with phthalic anhydride, contained 4.7 percent of non-carboxyl-terminated polybutadiene.

Example V

This example illustrates that linearity of the polymer is lost when the polymerization step is carried out in the presence of ether.

To 200 parts by volume of dry dimethoxy ethane cooled to −30° C. was added 0.985 part of butyl lithium followed by 34.9 parts of butadiene-1,3 at such a rate that the temperature was maintained at −30° C. by external cooling and rapid stirring. After complete reaction of the butadiene, 3 parts of ethylene oxide was added, the mixture was stirred at −30° C. for an additional 30 minutes, and the contents of the reactor were then poured over powdered Dry Ice.

The liquid product, 32.9 parts (90.0 percent), was acidified and isolated by the procedure of Example I. It had a viscosity of 210 poise/25° C., an acid number of 0.36, a hydroxyl number of 21.66, and a ratio of alkenyl to internal unsaturation of 3.5. The molecular weight by end group analysis was 2500. The product, therefore, had undesirably high viscosity associated with a non-linear structure.

Example VI

Lithiopolybutadiene in n-heptane was prepared by the procedure of Example I using 0.985 part of butyl lithium and 29.1 parts of butadiene-1,3. The resulting solution was cooled to −30° C. Then 35 parts of cold dimethoxyethane followed by 4 parts of ethylene oxide were added under agitation. After 30 additional minutes of stirring, the solution was poured over powdered Dry Ice. The product was then acidified and isolated by the procedure of Example I.

The liquid product, 28.5 parts (92.0 percent), had a viscosity of 8.75 poise/25° C., a hydroxyl number of 24.5, and a ratio of vinyl to internal unsaturation of 0.314. The molecular weight by end group analysis was 2240. The product analyzed for 5.8 percent of non-hydroxyl-containing polybutadiene.

Example VII

Lithiopolybutadiene in 140 parts of n-heptane was prepared as in Example I using 0.99 part of butyl lithium and 30.1 parts of butadiene-1,3. The resulting solution was cooled to −30° C. Then 15 parts of cold diethyl ether followed immediately by 2 parts of ethylene oxide were added with agitation. After 30 additional minutes of stirring, the solution was poured over powdered Dry Ice. The product was then acidified and isolated by the procedure of Example I.

The liquid product, 28.2 parts (89.0 percent), had a viscosity of 14.5 poise/25° C., a hydroxyl number of 29.36, an acid number of 0.23, and a ratio of vinyl to internal unsaturation of 0.24. The molecular weight by end group analysis was 1900. The product analyzed for 7.15 percent of non-hydroxyl-containing polybutadiene.

TABLE II.—ETHYLENE OXIDE TERMINATION OF LITHIOPOLYBUTADIENE, PRODUCT PURITY

| Example | Termination Temp., ° C. | Solvent, Weight percent | Vinyl/Internal Unsaturation Ratio | Hydrocarbon Contaminant, percent |
|---|---|---|---|---|
| I | 5 | Heptane, 100 | 0.425 | 17.6 |
| II | −30 | do | 0.24 | 12.3 |
| III | −60 | do | 0.233 | 9.7 |
| VI | −30 | Heptane, 80; Ether,[1] 20. | 0.314 | 5.8 |
| VII | −30 | Heptane, 90.3; Ether,[2] 9.7. | 0.24 | 7.2 |

[1] 1,2-dimethoxyethane.
[2] Diethyl ether.

The above data indicate that the use of an ether in place of a portion of the hydrocarbon solvent (Examples VI and VII) increases substantially the product purity. Another advantage of the products produced by the process of this invention is that they have lower viscosities than their non-linear homologs having the same molecular weight, thus simplifying the handling of these materials at higher molecular weights in subsequent reactions where mixing efficiency is critical, for example, in mixing glycol products with diisocyanates to produce polyurethane foams or elastomers. This is summarized below:

TABLE III

| Example | Vinyl/Internal Unsaturation Ratio | Molecular Weight | Bulk Viscosity, Poise/25° C. |
|---|---|---|---|
| II | 0.24 | 2,580 | 9.8 |
| IV* | 0.215 | 2,510 | 15.6 |
| V | 3.5 | 2,500 | 210 |
| VI | 0.314 | 2,240 | 8.75 |
| VII | 0.24 | 1,900 | 14.5 |

*Carboxy-terminated.

The high purity of the linear terminally-functionalized polydienes of this invention is important also in that these polydienes may be converted to compounds of comparable high purity, for example, by reaction with ethylene oxide or with propylene oxide at temperatures above about 60° C. to yield block copolymers essentially free of diene homopolymer.

Example VIII 0.019 equivalent of pentamethylene dilithium, prepared by ball milling pentamethylene dichloride with lithium metal in 80 parts of benzene diluent (see U.S. 2,947,793), was transferred under argon to a reactor like that of Example I and diluted with 70 parts of dry n-heptane. At 50° C., 32.1 parts of butadiene was distilled into the reactor at a sufficient rate to maintain reflux (1 hour), and an hour completion time was then allowed. High speed stirring was maintained during the butadiene polymerization. The reactor and its contents were chilled to −20° C., 35 parts of −20° C. dimethoxyethane was injected, and then about 5 parts of ethylene oxide gas was added when the reaction mixture thinned. The mixture was then allowed to warm to ambient temperature, about 25 parts of powdered Dry Ice was mixed in, and the product was finally isolated as in Example I.

The product diol, 30.7 parts, had a hydroxyl number of 19.23, an acid number of 0.09, a viscosity of 33 poise/25° C., and a ratio of vinyl to internal unsaturation of 0.263. The molecular weight by end group analysis was 5800.

*Example IX*

0.0338 equivalent of bis(4-lithiobutyl) ether, prepared by ball milling bis(4-chlorobutyl) ether with a slight excess of lithium metal in 70 parts of n-heptane diluent was transferred under argon to a reactor like that of Example I and diluted with 70 parts of dry n-heptane. 46.41 parts of butadiene-1,3 was added at 50° C., followed by 35 parts of cold dimethoxyethane and about 3.5 parts of ethylene oxide at −20° C. and, finally, about 20 parts of powdered Dry Ice as in Example VIII.

The product glycol, 48.5 parts isolated by the methods of Example I, had a hydroxyl number of 36.76, an acid number of 0.09, a viscosity of 34 poise/25° C., and a ratio of vinyl to internal unsaturation of 0.924. The content of vinyl unsaturation, 48 percent, reflected the modifying effect of the ether linkage in the catalyst. Molecular weight by end group analysis was 3040.

*Example X*

The analysis for homogeneity applied to monool products in Examples I through VII was not applicable to the diols; therefore, evaluation of the substantially di-functional nature of the diol was made by chain extending with a di-functional reagent (see Flory, Principles of Polymer Chemistry, Cornell University Press, Ithaca, N.Y., 1953, pages 91–95).

10 Parts of the diol product of Example IX, containing a trace of t-butyl catechol as antioxidant, was mixed uniformly with 0.516 part by volume of toluene diisocyanate at ambient temperature and poured while fluid into a flat aluminum dish (mold release coated) to a depth of about ¼ inch. The mixture was cured in a 130° C. oven for 6 hours and cooled. There resulted a firm elastomer having very little tackiness and reasonable strength and elasticity.

In contrast, a sample of polybutadiene diol prepared as in Example IX, but without ether being added at the ethylene oxide termination step gave a viscous syrup when chain extension with toluene diisocyanate was attempted.

The high purity of the linear terminally-functionalized polydiene diols of this invention is important in that these linear polydiene diols may be chain extended at relatively low mixing temperatures into high molecular weight polymers, e.g., into polyurethane elastomers by chain extension with a diisocyanate. The combination of the high purity of the linear diols and their relatively low viscosities is particularly advantageous in that relatively high molecular weight diols of maximum weight per unit molecular length may be readily mixed with coreactants such as diisocyanates at ambient temperatures.

While the process of the present invention employs ethylene oxide as the olefin oxide that is reacted with the linear lithium-terminated polydienes to yield products having primary hydroxyl end groups, the process may be extended to the reaction of linear lithio- or dilithiopolydienes with other olefin oxides, for example, with propylene oxide to yield products having secondary hydroxyl end groups or with butadiene-1,3-dioxide to yield an extended polymer product.

While there are above disclosed but a limited number of embodiments of the invention herein presented, it is possible to produce still other embodiments without departing from the inventive concept herein disclosed. It is desired, therefore, that only such limitations be imposed on the appended claims as are stated therein.

What is claimed is:

1. A process for the preparation of substantially pure linear hydroxyl-terminated polydienes having a molecular weight in the range of about 500 to 10,000, characterized by a ratio of alkenyl to internal unsaturation within the range of about 0.1 up to 1, and in which more than about 92 percent of the polydiene chains are terminated with primary hydroxyl groups which comprises reacting at a temperature between about −60° and +10° C. a linear lithium-terminated polydiene with an olefin oxide in a solvent selected from the group consisting of ethers and hydrocarbon-ether mixtures and recovering said linear hydroxyl-terminated polydiene, said linear lithium-terminated polydiene being obtained by the reaction of a lithium compound with a diene in an ether-free hydrocarbon medium, said polydiene being selected from the group consisting of mono- and dilithium-terminated linear poly-1,3-butadiene, polyisoprene, poly-1,3-pentadiene, polychloroprene, poly-2,3-dimethyl-1,3-butadiene, and mono- and dilithium-terminated copolymers of styrene and said 1,3-dienes; said ether being selected from the group consisting of hydrocarbyl aliphatic ethers and hydrocarbyl aromatic ethers; and said olefin oxide being selected from the group consisting of ethylene oxide, propylene oxide, butylene oxide, and styrene oxide.

2. The process of claim 1 wherein said polydiene is poly-1,3-butadiene.

3. The process of claim 1 wherein the olefin oxide is ethylene oxide and the product is a linear primary hydroxyl-terminated polydiene.

4. The process of claim 1 wherein the amount of the olefin oxide is in the range of about 1 up to about 10 moles per atom of terminal lithium.

5. The process of claim 1 wherein the ether is dimethoxyethane.

6. The process of claim 1 wherein the ether is diethyl ether.

7. A process for the preparation of substantially pure linear primary hydroxyl-terminated polydienes having a molecular weight in the range of about 500 to 10,000, characterized by a ratio of alkenyl to internal unsaturation within the range of about 0.1 up to 1, and in which more than about 92 percent of the polydiene chains are terminated with primary hydroxyl groups which comprises reacting lithio-poly-1,3-butadiene with ethylene oxide in a solvent comprising heptane and dimethoxyethane, the amount of said dimethoxyethane ranging from about 1 up to about 50 percent of the heptane, at a temperature between about 10° and −60° C., the amount of ethylene oxide ranging from about 1 to about 10 moles per atom of terminal lithium, said lithiopolybutadiene being obtained by the reaction of a lithium compound with butadiene in an ether-free hydrocarbon medium.

8. The process of claim 7 wherein the amount of dimethoxyethane ranges from about 10 to 30 percent of the heptane, the amount of ethylene oxide ranges about 1.5 to 2.5 moles per atom of terminal lithium, and the temperature is between about −10° and −30° C.

9. A process for the preparation of substantially pure linear primary hydroxyl-terminated polydienes having a molecular weight in the range of about 500 to 10,000, characterized by a ratio of alkenyl to internal unsaturation within the range of about 0.1 up to 1, and in which more than about 92 percent of the polydiene chains are terminated with primary hydroxyl groups which comprises reacting lithiopoly-1,3-butadiene with ethylene oxide in a solvent comprising heptane and diethyl ether, the amount of said diethyl ether ranging from about 1 up to about 50 percent of the heptane, at a temperature between about 10° and −60° C., the amount of ethylene oxide ranging from about 1 to about 10 moles per atom of terminal lithium, said lithiopolybutadiene being obtained by the reaction of a lithium compound with butadiene in an ether-free hydrocarbon medium.

10. The process of claim 9 wherein the amount of diethyl ether ranges from about 10 to 30 percent of the heptane, the amount of ethylene oxide ranges from about 1.5 to 2.5 moles per atom on terminal lithium, and the temperature is between about −10° and −30° C.

11. Hydroxyl-terminated polydiene hydrocarbons having a molecular weight in the range of about 500 to 10,000 characterized by a ratio of alkenyl to internal unsaturation within the range of about 0.1 up to 1 and in which more than about 92 percent of the polydiene chains are terminated with primary hydroxyl groups, said hydroxyl-terminated polydiene hydrocarbons being selected from the group consisting of substantially pure monools and substantially pure diols and being prepared by the process of claim 1.

12. The composition of claim 11 wherein the hydroxyl-terminated polydiene hydrocarbon is a substantially pure monool.

13. The composition of claim 11 wherein the hydroxyl-terminated polydiene hydrocarbon is a substantially pure diol.

References Cited by the Examiner

UNITED STATES PATENTS

| | | | |
|---|---|---|---|
| 2,850,538 | 9/1958 | Nobis et al. | 260—635 |
| 3,055,952 | 9/1962 | Goldberg | 260—635 |

LEON ZITVER, *Primary Examiner.*

J. E. EVANS, *Assistant Examiner.*